United States Patent [19]

Tomka

[11] Patent Number: 5,280,055
[45] Date of Patent: Jan. 18, 1994

[54] BIODEGRADABLE MOULD MATERIAL

[76] Inventor: Ivan Tomka, Chalet Breitfeld, 1722 Bourguillon, Switzerland

[21] Appl. No.: 977,230

[22] Filed: Nov. 16, 1992

[30] Foreign Application Priority Data

Nov. 14, 1991 [CH] Switzerland ............... 3320/91

[51] Int. Cl.$^5$ .................. C08L 3/00; C08S 1/00
[52] U.S. Cl. .......................... 524/47; 524/35
[58] Field of Search ...................... 524/35, 47

[56] References Cited

U.S. PATENT DOCUMENTS 5,095,054 3/1992 Lay et al. ................. 524/47

Primary Examiner—John Kight, III
Assistant Examiner—T. Mosley
Attorney, Agent, or Firm—Ostrolenk, Faber, Gerb & Soffen

[57] ABSTRACT

A biodegradable mould material or polymer blend with a high resistance to moisture is obtained by mixing thermoplastically processable starch with a cellulose derivative, such as a cellulose ester.

19 Claims, 9 Drawing Sheets

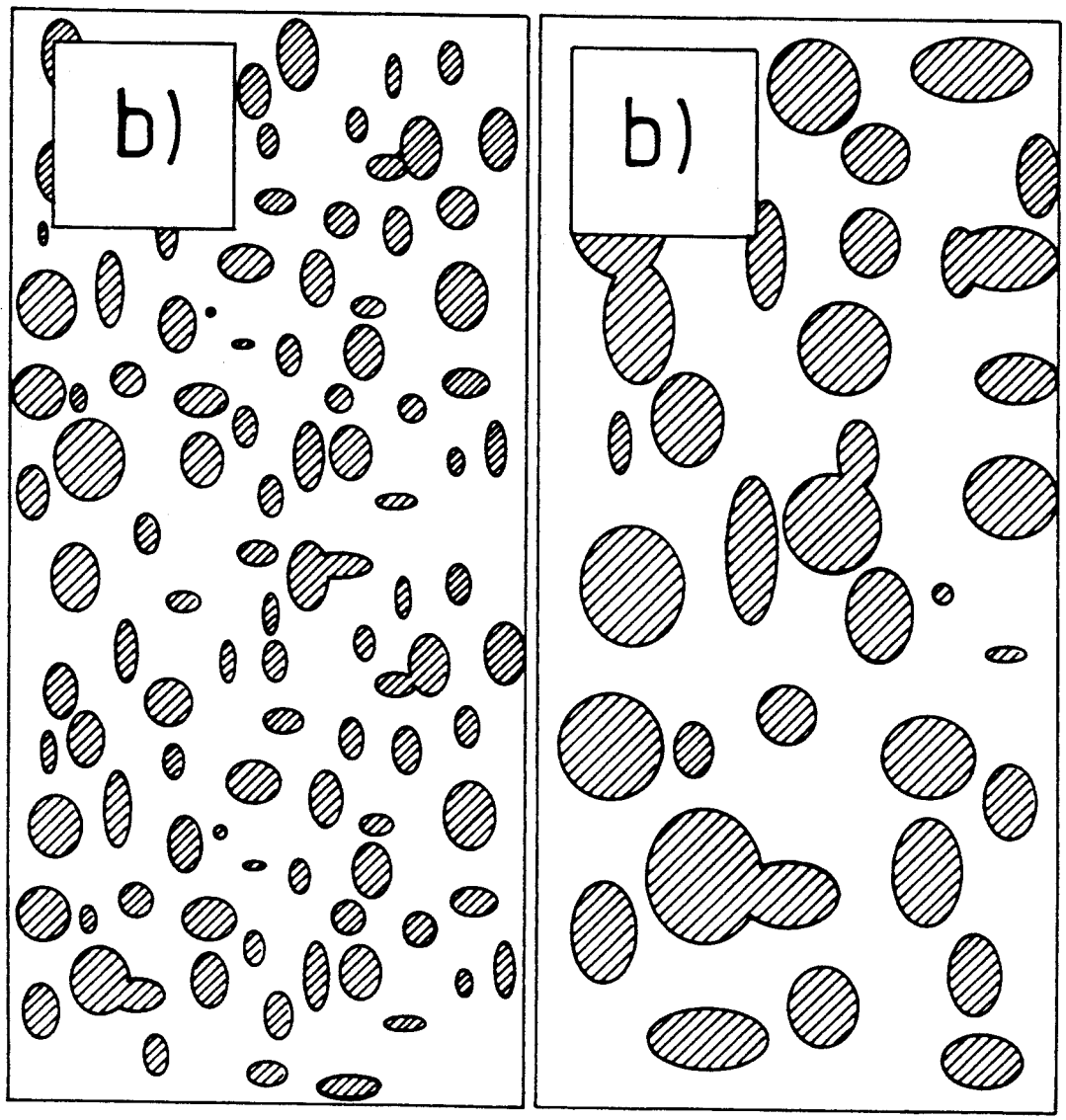
|—— 20 ——|
 CAB
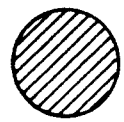
FIG. 8b    FIG. 7b

BIODEGRADABLE MOULD MATERIAL

This invention relates to a biodegradable mould material or a polymer blend with enhanced resistance to moisture, to a process for the production of a mould material or a polymer blend and to a moulding or an extrudate consisting essentially of a mould material or a polymer blend.

At the current state of technology, a number of mould materials are known which consist at least in part of starch or gelatine or of biopolymers and are therefore essentially biodegradable.

The increased application of biopolymers such as starch or gelatine in applications of plastics which are in themselves pure is attributable, on the one hand, to the desire to make increased use of renewable raw materials, instead of using a petrochemical or fossil basis for plastics, and, on the other hand, to the requirement that plastic products produced from polymers should be biodegradable. For example, EP-A 0 118 240, EP-A 0 092 908, EP A-0 304 401 and EP-A 0 326 517 propose biopolymers or mould materials composed of broken down starch or gelatine and other hydrophilic biopolymers such as proteins, cellulose, etc., which are particularly suitable for injection moulding, such as the production of capsules. The use of starch or gelatine alone or in the proposed mixtures is limited to a few applications, as it presents problems because of the strongly hydrophilic properties of starch or gelatine and the tendency of these substances to swell, and also because of the relatively poorer mechanical properties resulting from the use of starch or gelatine or a mixture of the two. By cross-linking the starch polymers it is possible to reduce the swelling tendency, but this generally requires high cross-linkage densities. This calls for large quantities of cross-linking agents which are relatively costly and require special processes to obtain the appropriate cross-linking reactions.

For these reasons EP-A 402 826 proposes filled polymers or polymer blends produced by mixing natural starch or its derivatives with ethylene copolymers. In WO 90-14388 it is proposed that, for the purpose of producing a polymer compound, natural starch should be mixed with polyethylene and that either ethylene acrylic acid copolymers or glycerine should be added. These polymer mixtures exhibit relatively poor mechanical properties even in the production of injected mouldings and are unsuitable, for example, for the production of film. It appears that the natural structure of the starch is retained in these blends, at least in part, and this obviously detracts from their suitability as "engineering plastic". The proportion of ethylene acrylic acid copolymer also accounts for the fact that their biodegradability is very limited.

EP-A 0 327 505, EP-A 0 404 723, EP-A 0 407 350, EP-A 0 404 727 and EP-A 0 404 728 propose a number of polymer blends which are based on the breakdown of starch and on starch with a very wide variety of structures and also contain a wide variety of polymers or copolymers. Broken down starch is a modified form of starch obtained from natural starch, which is processed with a moisture content of approximately 15-20%, i.e. the moisture content that is normal in native starch, and is subjected to heat and mechanical effort. Investigations made particularly in connection with WO 90-05161 have shown that the breakdown of starch is of only limited use as an "engineering plastic", as evidently natural structures are present in this form of starch too. Moreover, the polymers proposed as additions to starch are biodegradable only to a very limited extent or over extremely long periods of time, so that they do not satisfy the biodegradability requirements.

It is also proposed in EP-A O 400 531 and EP-A O 400 532 that the starch should be broken down by means of a high-boiling plasticizing agent and a breakdown agent; the plasticizing agent may be glycerine and the breakdown agent may be urea. To the starch which has been broken down by this method up to 15% of ethylene acrylic acid and/or polyvinyl alcohol copolymers are added. Use of the plasticizing agent and the breakdown agent does permit some improvement in the breakdown effect on the natural starch, but sheet, for example, produced in accordance with EP-A O 400 531/2, is not of a quality which is adequate, for example, for it to be used as packing film with high mechanical requirements. Here again the proportion of ethylene acrylic acid and polyvinyl copolymers has the effect of substantially limiting biodegradability.

For this reason an attempt was made to take the thermoplastically processable starch proposed in WO 90-05161 as the basis. This starch is mostly free of natural structural components. Further details on the production and properties of thermoplastically processable starch will not be given here, but reference is made to WO 90-05161, the contents of which are hereby stated to form part of the present description. Briefly, an essentially water-free starch is combined with an additive which lowers the melting point of the starch so that the melting point of the starch/additive mixture lies below the decomposition temperature of the starch, the additive having a solubility parameter of over 15 $cal^{\frac{1}{2}}cm^{-3/2}$ and a vapor pressure lower than 1 bar at the melting range of the starch/additive mixture, and the resulting mixture is caused to melt by the application of heat and mechanical energy to realize an essentially moisture-free product.

Consequently, WO 91-16375 uses, as the starch basis for the production of a polymer blend, the abovementioned thermoplastically processable starch. In accordance with WO 91-16375 the thermoplastically processable starch (TPS) is, for the purpose of producing a blend, mixed with polyolefin, such as polyethylene or polypropylene. The film produced from this blend exhibits good mechanical properties and good moisture-resistance, but the biodegradability is still negatively affected by the proportion of polyolefin.

One purpose of the present invention is therefore to propose a biodegradable mould material or a polymer blend with enhanced resistance to moisture. This material is based, to a large extent, on renewable raw materials, but nevertheless exhibits good mechanical properties when used in so-called plastics applications.

This purpose of the invention is achieved by means of a mould material or a polymer blend as described herein.

The mould material proposed by the invention is characterized by the fact that it contains, in addition to the thermoplastically processable starch, which is itself hydrophilic, a cellulose derivative, preferably a cellulose ester, so that both components of the material are derived 100% from biological resources. The biodegradability is therefore essentially assured. However, the addition of the cellulose ester results in mechanical properties which are markedly superior to those of pure thermoplastically processable starch.

The mould material is characterized by the fact that the thermoplastically processable starch is encapsulated in a cellulose ester matrix, with the dispersed phase of the thermoplastically processable starch having a domain size, i.e. the size of the dispersed portions, of 0.5-10 μm (micrometers), but preferably <3 μm.

Preferred compositions of the mould material or polymer blend proposed by the invention are characterized herein.

It is advantageous to use approximately 20-50% by volume of thermoplastically processable starch and approximately 30-60% by volume of cellulose ester, which may be cellulose acetate, cellulose propionate, cellulose butyrate or cellulose valerate, or a mixture thereof. Cellulose acetate may take the form of mono-, di- or tri-acetate, but of course other cellulose esters such as mixed esters can be used, and a mixture of several carbonic acids may be used to produce them, including for example two or more of the following acids: acetic acid, propionic acid, butyric acid, valeric acid, etc.

For the purpose of improving the phase mixing, the mould material or polymer blend may include a softener; the softener is added to fix the viscosities of the two phases during the production of the mould material in such a manner that the proper morphology can be created. For softening a known softener of cellulose esters can be used, for example acetyl triethyl citrate or phthalic acid ester. However, all those substances are suitable for use as softeners which are defined in the abovementioned WO 90-05161 and WO 91-16375 as softeners or additives suitable for the production of thermoplastically processable starch.

As an alternative to adding a softener, it is also advantageous to add a phasing agent to the mould material or the polymer blend; the agent makes it possible to improve the adhesion of the two phases through physical interaction and/or chemical reaction with the cellulose ester phase and the thermoplastically processable starch phase. One or more of the phasing agents in the the claims will be particularly suitable as phasing agents.

For the purpose of producing the mould materials or the polymer blend to which the invention refers, the invention proposes a process in which the thermoplastically processable starch, which is itself hydrophilic, is processed by the addition of a cellulose derivative, preferably a cellulose ester, to a material with a reduced absorption of water. As was mentioned above, this material can be obtained 100% from biological resources, so that the biodegradability is basically assured.

The mould materials or polymer blends proposed by the invention are basically suitable for all known so-called plastic applications, i.e. for the production of injection mouldings and for the production of extrudates such as sheet and tubing.

BRIEF DESCRIPTION OF DRAWINGS

The invention will now be explained in detail by means of examples and by reference to the attached diagrams, as follows:

FIGS. 7a and 7b show, by means of a view through a scanning electron microscope and in a simplified drawing, the effect of a softener on the reciprocal ordering of the phases in a mould material proposed by the invention;

FIGS. 8a and 8b show, also by means of a view through a scanning electron microscope and in a simplified drawing, the corresponding effect of a phasing agent on the reciprocal ordering of the phases, and FIG. 9 plots the moisture sorption of a polymer blend proposed by the invention against the volume percentage of thermoplastically processable starch.

EXAMPLE 1

Mixtures of Thermoplastically Processable Starch with Cellulose Acetobutyrate (CAB).

Source materials: Granular substances composed essentially of moisture-free thermoplastically processable starch with 30% glycerine and cellulose acetobutyrate (Kodak Tenite Butyrate 525 granular material).

Figure 1:
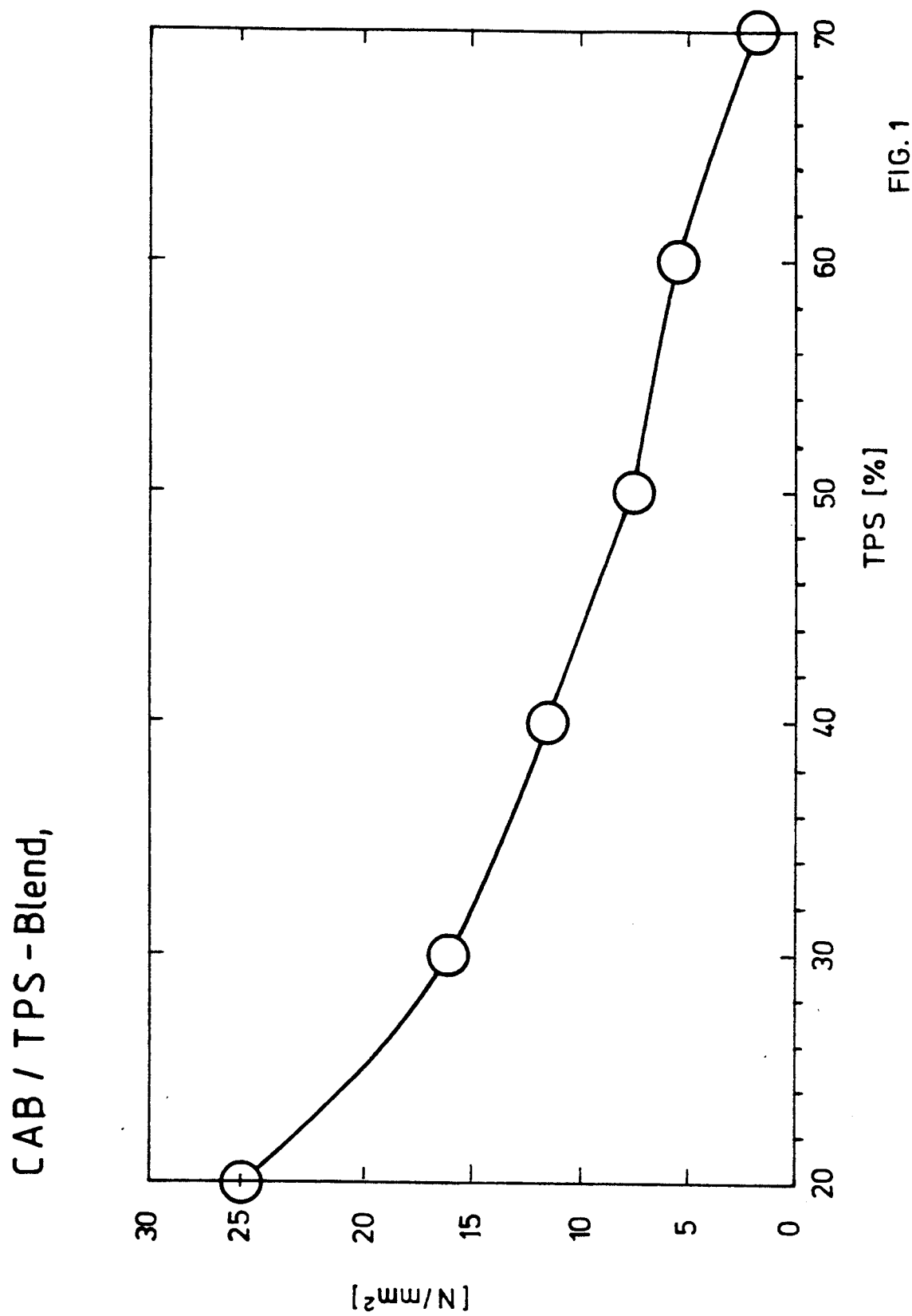
FIG. 1 shows a graph plotting the tensile stress of a polymer blend proposed by the invention against the volume percentage of thermoplastically processable starch (TPS)
Figure 2:
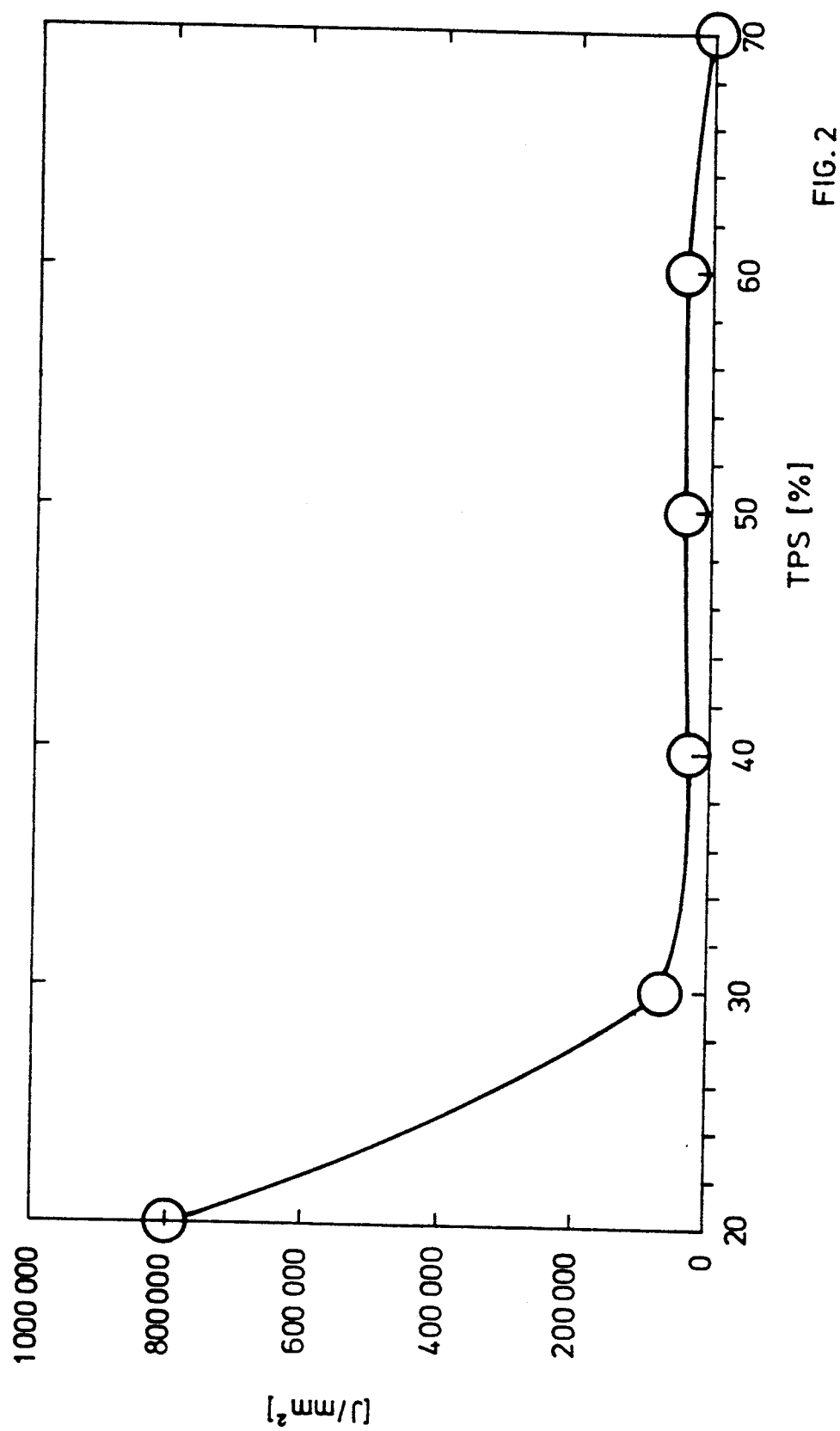
FIG. 2 plots the breaking energy against the volume percentage of TPS.

The mixture of the two abovementioned materials was mixed for 10 minutes at 170° C. in a Brabender mixer at 100 rpm and then pressed at 160° C. to form a 0.2 mm slab. The volume percentage of thermoplastically processable starch was 20-70%. FIGS. 1 and 2 plot, respectively, the tensile stress and the breaking energy against the volume percentage of thermoplastically processable starch. The shape of the curve in both FIGS. 1 and 2 shows clearly that the mechanical properties of the mould material become markedly worse when the volume proportion of thermoplastically processable starch reaches 30-40%.

The mould material proposed in this example is suitable for injection moulding, but in no case should more than 40% of thermoplastically processable starch be used.

Figure 9:
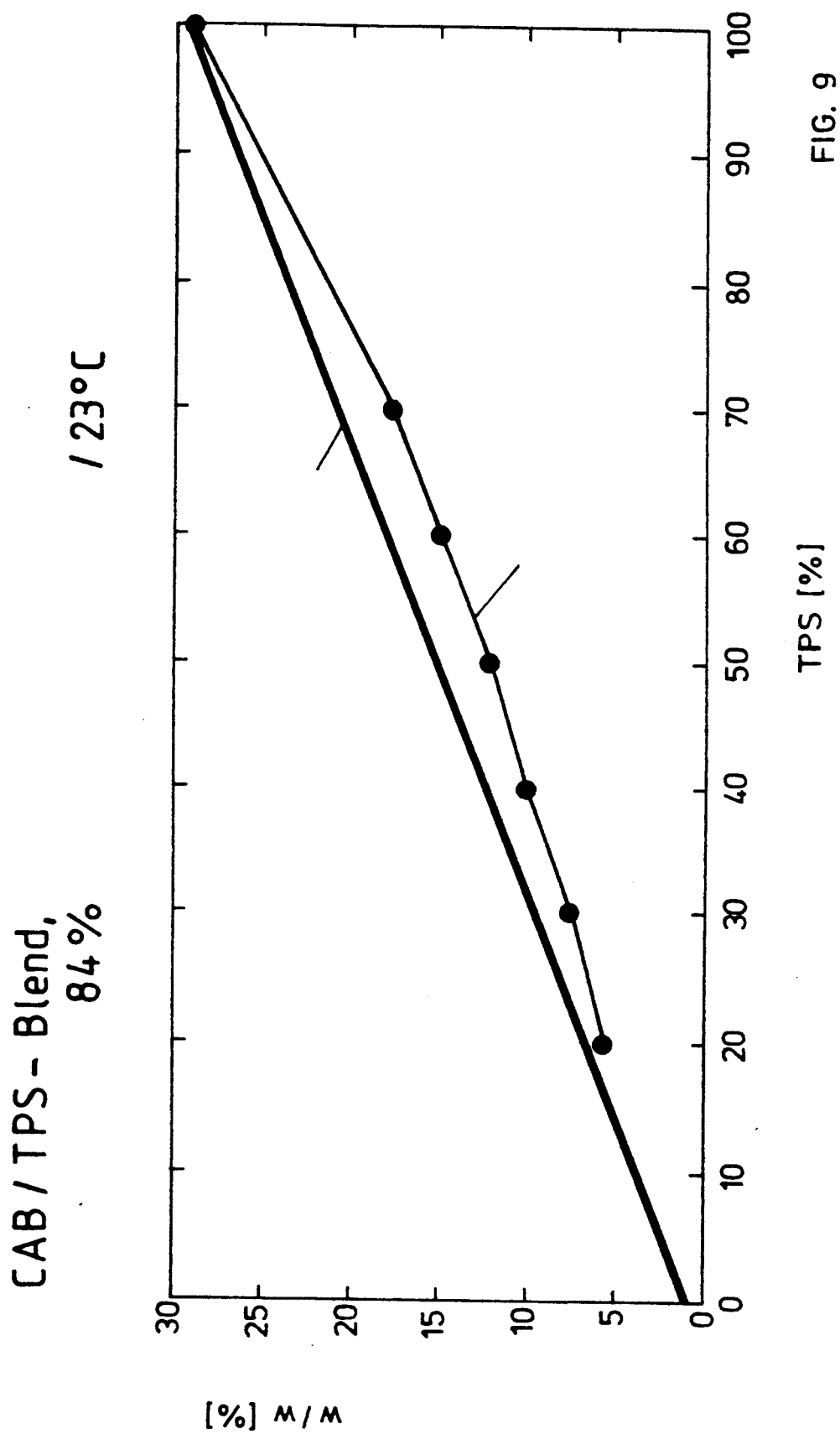

The mixtures produced as in Example 1 from thermoplastically processable starch and cellulose acetobutyrate (CAB) were also tested for moisture sorption, and samples produced from the equivalent blends were stored for 10 days at a relative humidity of 84% at 23° C. The results are shown in FIG. 9, where the moisture intake appears as a function of the volume proportion of TPS in the sample. In this Figure, the intake of moisture means the percentage by weight of the moisture in the moistened sample. FIG. 9 shows clearly that the moisture sorption of the blend produced as described in Example 1 is clearly lower than the value which can be calculated on the assumption that the two components TPS and CAB display additive sorption. From this it is possible to infer an additional property of the blend produced as in Example 1, that is to say, the moisture sorption can be clearly reduced by the production of the blend.

EXAMPLE 2

Mixture of Thermoplastically Processable Starch with Cellulose Acetobutyrate and Acetyl Triethyl Citrate as Softeners Source materials: Granular substances composed essentially of moisture-free thermoplastically processable starch with 30% glycerine, cellulose aceto-butyrate (CAB, Kodak Tenite Butyrate 525 granular material) and acetyl triethyl citrate (from Akzo).

Mixtures of the three abovementioned materials were mixed for 10 minutes at 170° C. in a Brabender mixer at 100 rpm and then pressed at 160° C. to form a 0.2 mm slab. The volume proportion of thermoplastically processable starch was 40%, the volume proportion of cellulose butyrate was 35–55% and the volume proportion of softeners was 5–25%. The mechanical values obtained are shown in FIGS. 3 through 6. FIG. 7 shows a view through a scanning electron microscope of the samples with the best mechanical properties.

Figure 5:
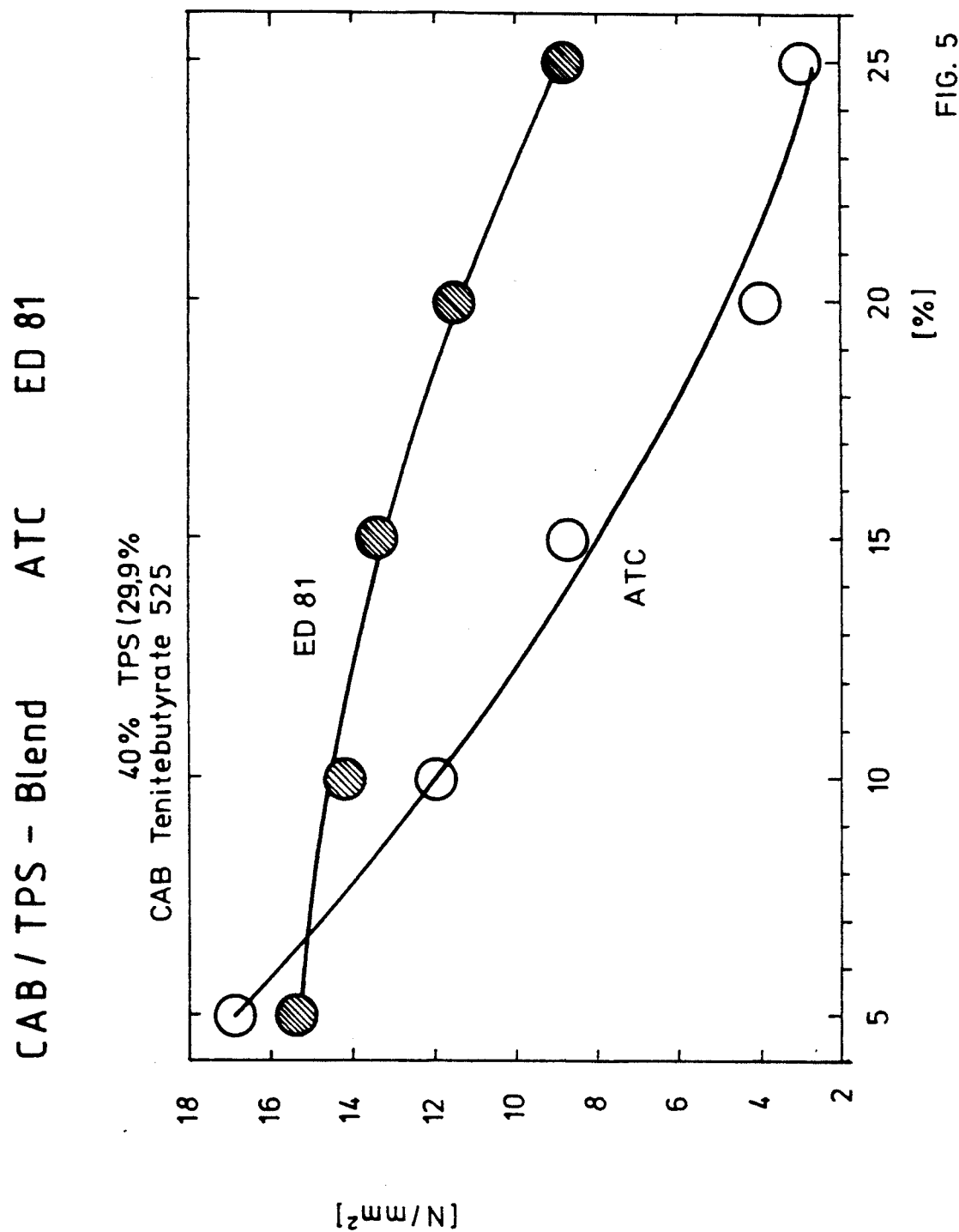
FIG. 5 shows the effect of the softener or phasing agent on the tensile stress.
Figure 6:
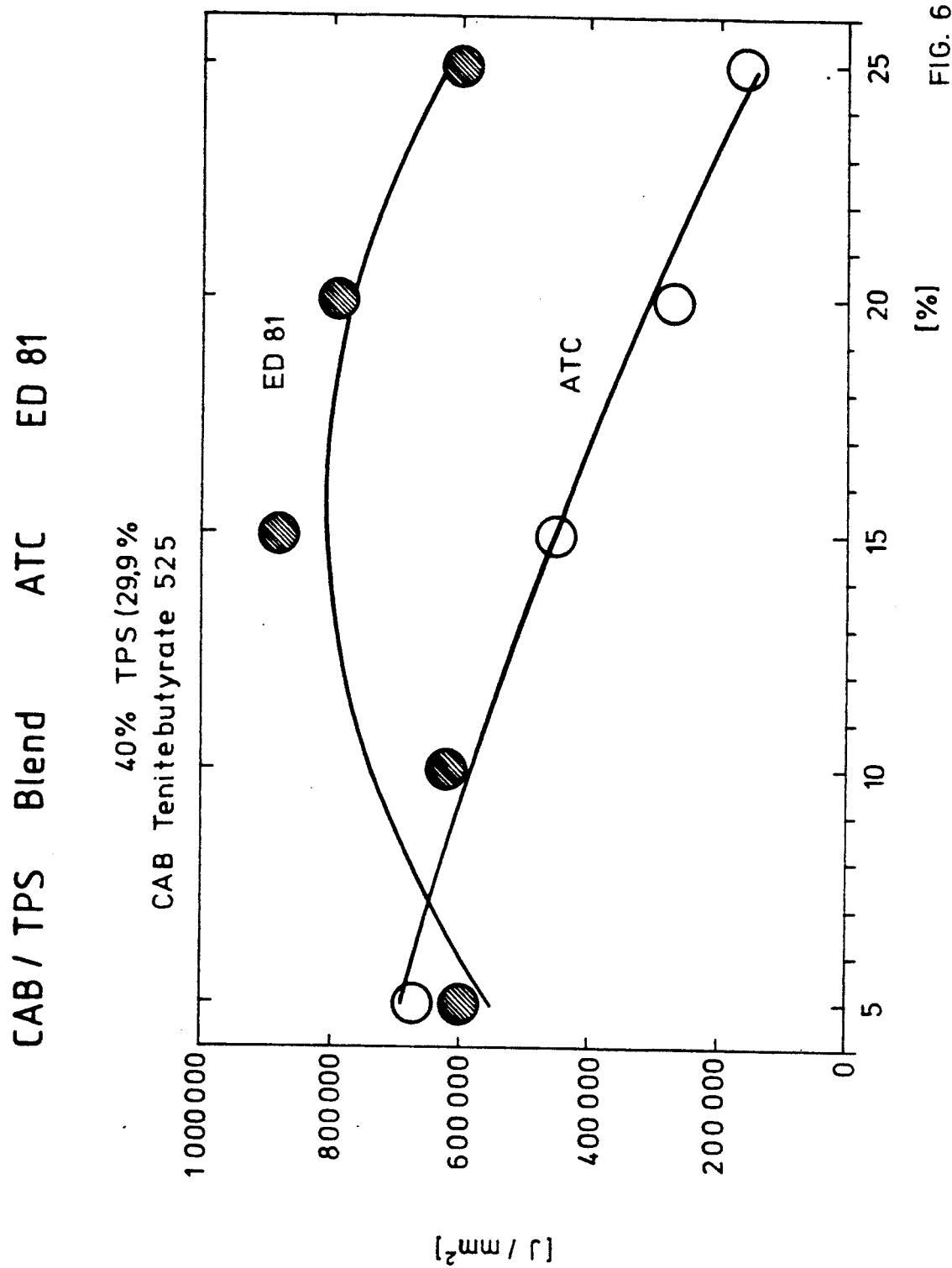
FIG. 6 shows the effect of the softener or phasing agent on the breaking energy.

A comparison of the two FIGS. 1 and 5 shows that the addition of a small quantity of softeners, for example 5% by volume, results in an increase of approximately 30% in the tensile stress of the polymer blend. When 10% by volume of softener is added, the value of the tensile stress is identical with the value in FIG. 1, i.e. when no softeners are added. The continued increase in the proportion of the volume represented by softeners has a negative effect on the tensile stress. On the other hand, comparison of FIGS. 2 and 6 gives a somewhat different picture, for in this case a proportion of 5% by volume of softener raises the breaking energy of a polymer blend quite substantially in comparison with the value when no softener is used. Even a proportion of 25% by volume of softener still shows a breaking energy which is clearly better than in the case where no softener is used.

Polymer blends, produced as in this Example, can attain a breaking energy of up to 80%, so that these mould materials are suitable both for injection moulding and for sheet and film extrusion. The mixtures in this Example therefore exhibit essentially better properties than the mixtures in Example 1, at least where rupture elongation is concerned.

EXAMPLE 3

Thermoplastically Processable Starch, Cellulose Acetobutyrate (CAB) and Epoxidized Soybean Oil as Phasing Agent Source materials: Granular substances composed of thermoplastically processable starch with 30% glycerine, cellulose aceto-butyrate (Kodak Tenite Butyrate 525 granular material) and epoxidized soybean oil (ED 81 from the Henkel Company).

Mixtures of the three named source materials were mixed by blending for 10 minutes at 170° C. in a Brabender mixer at 100 rpm and then pressed at 160° C. to form a 0.2 mm slab. The volume percentage of thermoplastically processable starch was 40%, the volume percentage of CAB was 35–55% and the volume percentage of epoxidized soybean oil was 5–25%. The mechanical data obtained are shown graphically in FIGS. 3 through 6. FIG. 8 shows a view through a scanning electron microscope of the samples with the best mechanical properties.

Figure 3:
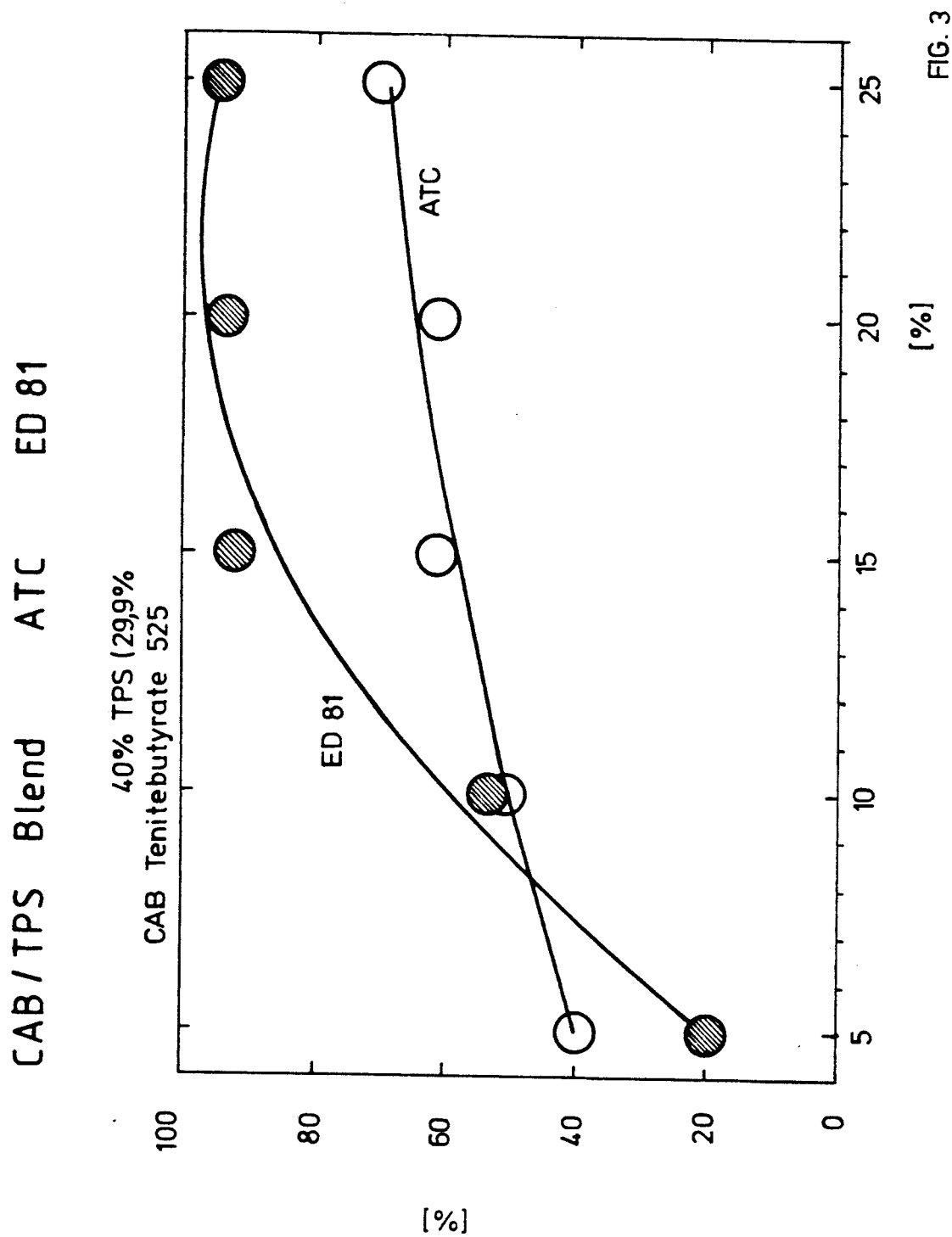
FIG. 3 shows the effect of adding a softener or a phasing agent on the rupture elongation of a polymer blend proposed by the invention.
Figure 4:
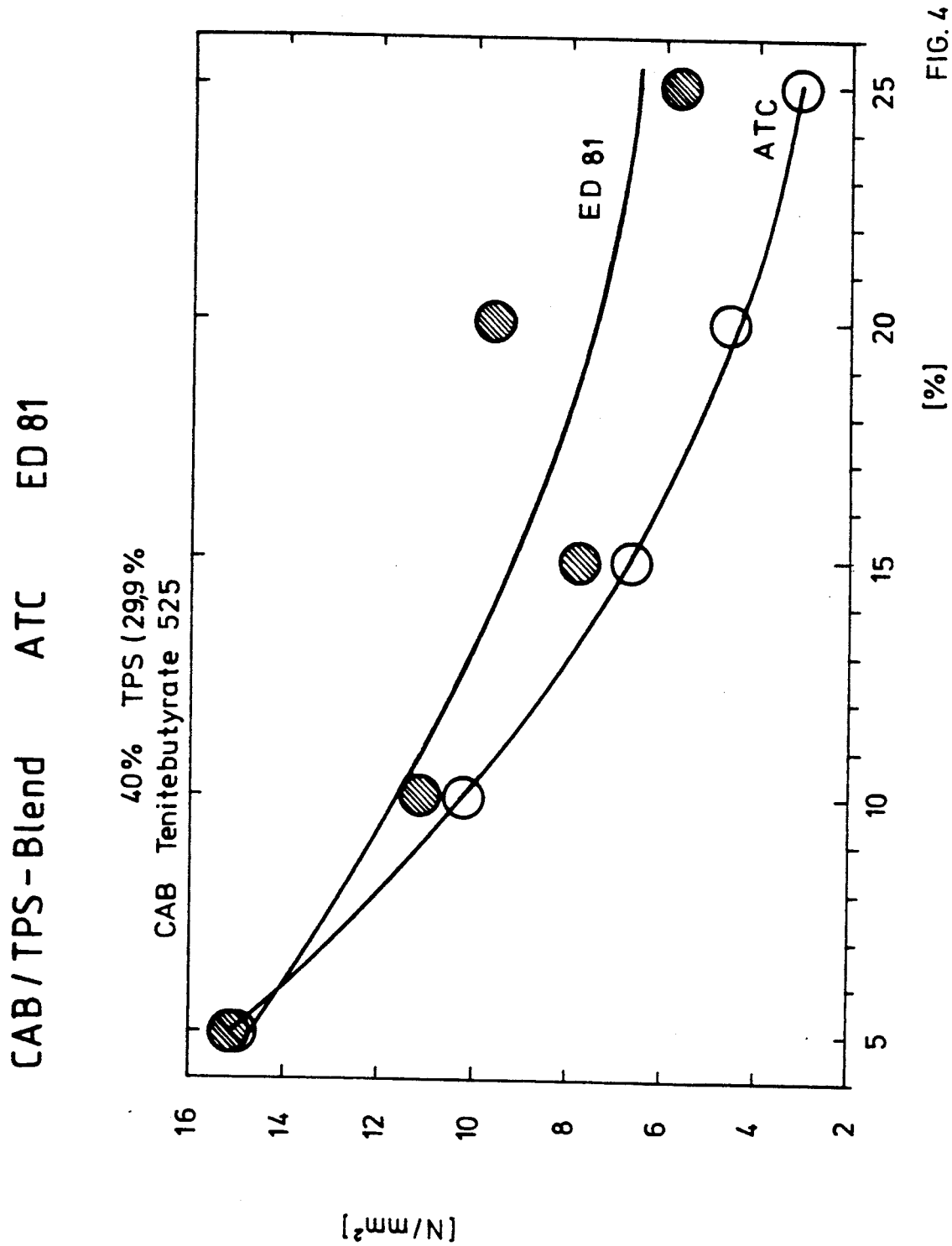
FIG. 4 shows the effect of a softener or phasing agent on the yield stress.

FIGS. 3 through 6 show clearly that the use of a phasing agent as "softener" makes possible, in part, a marked enhancement of the mechanical properties, as compared with the mixtures in which no phasing agent or softener, or only a pure softener, is used. In particular, FIG. 3 shows clearly that with the mixtures produced in this Example it is possible to attain rupture elongations of up to 100%.

Because of the good mechanical properties, and particularly because of the excellent rupture elongations, the mould materials proposed in this Example are suitable not only for injection moulding but also for sheet and for extrusion in general. As compared with the mixtures in Examples 1 and 2, there are noticeable improvements in the mechanical properties. Moreover, it can be demonstrated by infrared spectroscopy that there is a partial reaction of the epoxide groups with the starch and/or the glycerine.

Figure 7A:
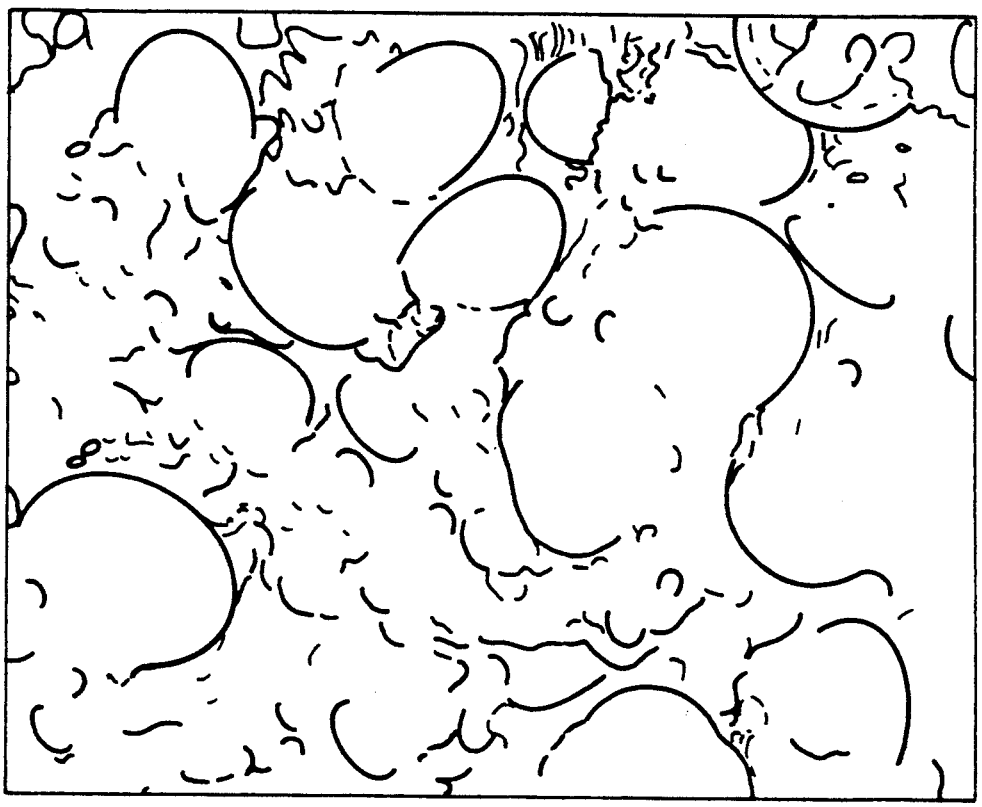
Figure 8A:
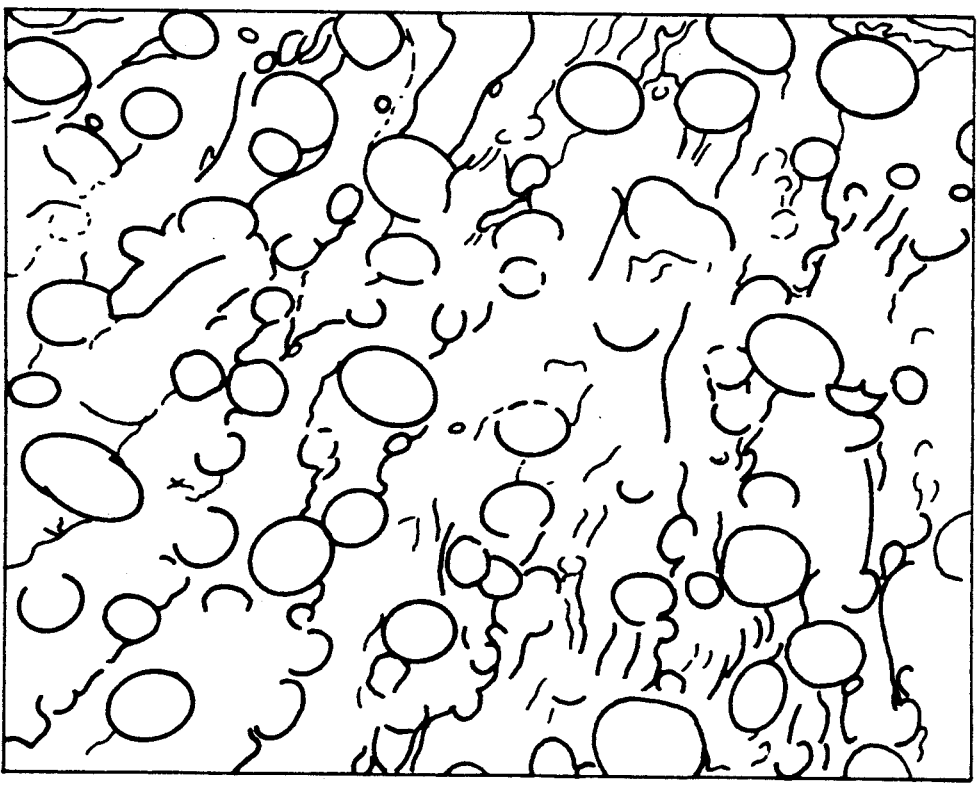

Furthermore, a comparison of FIGS. 7a and b and 8a and b shows that the reciprocal distribution of the phases of the thermoplastically processable starch and the cellulose ester is essentially more uniform when the phasing agent is used (FIG. 8) than it is when use is made of a pure softener, as shown in FIG. 7. This more uniform reciprocal distribution is probably also the reason why the mechanical properties are essentially better when a phasing agent is used than when use is made of a pure softener. FIGS. 7a and 8a respectively show views through a scanning electron microscope and FIGS. 7b and 8b show a simplified drawing of the electron microscope views.

EXAMPLE 4

Thermoplastically Processable Starch/Cellulose Aceto-Butyrate (CAB)/Epoxidized Soybean Oil as Phasing Agent and Partially Acetylated Starch as Additional Phasing Agent Source materials: Granular substances composed essentially of moisture-free thermoplastically processable starch with 30% glycerine, cellulose aceto-butyrate (Kodak Tenite Butyrate 525 granular material), epoxidized soybean oil (ED 81 from the Henkel Company) and partially acetylated starch, produced by the Mehltreter method (Lit), produced in acetic anhydride with a degree of substitution (DS) of 0.83, 1.2, 1.94 and 2.0.

Mixtures of the above named materials were mixed by blending for 10 minutes at 170° C. in a Brabender mixer at 100 rpm and then pressed at 160° C. to form a 0.2 mm slab. The proportion of thermoplastically processable starch was between 34 and 38%, the volume percentage of the cellulose ester (CAB) was 39–43%, the volume percentage of the epoxidized soybean oil was 15% and the volume percentage of the acetylated starch was 4–12%. The precise compositions will be found in the following Table 1. This Table also shows the relevant mechanical data.

The degree of substitution (DS) listed in the following Table 1 indicates how many hydroxyl groups in the anhydrous glucose unit of the starch are esterified. For example, DS 3 means that all three hydroxyl groups are esterified, that is to say, this is the maximum degree of substitution.

TABLE 1

Mixtures with partially acetylated starches
a)

| CAB Vol % | TPS Vol % | Acet. Starch Vol % | Yield Stress N/mm² | Rupture % | Tensile Stress N/mm₂ | Rupture Elongation n % | Rupture Energy J/mm² |
|---|---|---|---|---|---|---|---|
| Degree of Substitution DS = 0.83 ||||||||
| 43 | 38 | 4 | 7.3 | 6.2 | 10.4 | 67.0 | 550000 |
| 41 | 36 | 8 | 7.5 | 6.6 | 10.6 | 70.5 | 590000 |
| Degree of Substitution DS = 1.2 ||||||||
| 43 | 38 | 4 | 7.5 | 5.90 | 10.3 | 66 | 530000 |
| 41 | 36 | 8 | 7.9 | 6.81 | 9.3 | 48 | 460000 |
| 39 | 34 | 12 | 7.9 | — | 8.0 | 43 | 300000 |
| Degree of Substitution DS = 1.94 ||||||||
| 43 | 38 | 4 | 7.7 | 7.36 | 11.6 | 82.2 | 720000 |
| 41 | 36 | 8 | 7.5 | 5.22 | 11.6 | 80.0 | 700000 |
| 39 | 34 | 12 | 6.5 | 7.36 | 9.5 | 71.0 | 540000 |
| Degree of Substitution DS = 2.0 ||||||||
| 43 | 38 | 4 | 7.5 | 6.04 | 9.6 | 56 | 450000 |
| 41 | 36 | 8 | 7.8 | 6.07 | 8.6 | 41 | 310000 |
| 39 | 34 | 12 | 7.8 | 7.46 | 9.8 | 63 | 520000 |

The advantage of adding partially acetylated starch is, on the one hand, that the percentage of starch can be increased, so that, on the other hand, the percentage of cellulose acetate is reduced, and the phase adhesion between the two phases—thermoplastically processable starch and cellulose ester—can be improved; one consequence is that crazing no longer occurs in film produced from a polymer blend of this kind. In addition, the increased proportion of starch markedly improves biodegradability, but there is some loss of strength when the proportion of partially acetylated starch is high.

The Examples described above, showing a mould material or polymer blend proposed by the invention are intended to make the invention more easily understandable and can of course be altered or modified at choice, in any number of ways. For example, any currently known and technically usable cellulose esters can be used as cellulose derivatives, and any substances used as softeners or as plasticizing agents either for cellulose esters or for starch are suitable for use as softeners. Moreover, the list of phasing agents can be extended at will, the essential requirement being that the phasing agent makes it possible to improve the adhesion of the two phases.

I claim:

1. Biodegradable mould material or polymer blend with a high resistance to moisture, containing at least thermoplastically processable starch and a cellulose derivative and 5-25% by volume of a phasing agent, which by physical interaction or chemical reaction or both with the cellulose derivative phase and the phase of the thermoplastically processable starch makes it possible to improve the adhesion of both phases.

2. Mould material or polymer blend, in accordance with claim 1, containing 10-80% by volume of thermoplastically processable starch, the remaining proportion comprising cellulose ester.

3. Mould material or polymer blend, in accordance with claim 1, containing 20-50% by volume of thermoplastically processable starch.

4. Mould material or polymer blend, in accordance with claim 2, such that the cellulose ester is cellulose acetate, cellulose propionate, cellulose butyrate, or a mixture thereof.

5. Mould material or polymer blend, in accordance with claim 3, such that a mixed ester is used as the cellulose ester; the mixed ester produced by the use of a mixture of acids, containing at least two of the carbonic acids listed below, to serve as an esterifying component:
acetic acid
propionic acid
butyric acid
valeric acid.

6. Mould material or polymer blend, in accordance with claim 1, containing 5-25% by volume of a softener.

7. Mould material or polymer blend, in accordance with claim 1, such that the phasing agent contains at least one substance selected from the group consisting of:
block copolymers, consisting of at least two blocks A and B, of which at least one can be mixed at least partially with terephthalic acid and at least one can be mixed at least partially with the cellulose ester phase or;
reactive copolymers, carrying reactive groups and therefore able to form a covalent bond with the starch or the cellulose ester phase or both;
low-molecular phasing agents which can be mixed, at least in part, with the cellulose ester phase or the terephthalic acid phase or both and can also react with one of the two phases; and
starch derivatives, which are wholly or partially compatible with the matching cellulose esters, and a polymer compatible with the starch.

8. Process for the production of a mould material or a polymer blend in which 10-80% by volume of essentially moisture-free thermoplastically processable starch, which is the melted mixture product of essentially moisture-free starch and an additive having a solubility parameter of over 15 cal¼cm$^{-3/2}$, a vapor pressure of lower than 1 bar in the melting range of the starch/additive mixture and which lowers the melting point of the starch so that the melting point of the starch/additive mixture lies below the decomposition temperature of the starch, is mixed with a cellulose derivative at a raised temperature.

9. Process, in accordance with claim 8, such that 20-50% by volume of thermoplastically processable starch and 30-60% by volume of a cellulose ester, are thoroughly blended with 5-25% by volume of a softener or a phasing agent at a temperature of approximately 160° C.-200° C. and the material, which is at least almost homogenous, is then extruded or processed by injection moulding.

10. Process, in accordance with claim 9, such that a softener or a phasing agent or both is combined with the mixture during the production of the mould material or polymer blend.

11. Mould material or extrudate, consisting essentially of a mould material or a polymer blend in accordance with claim 1.

12. Mould material or extrudate, consisting essentially of a mould material or polymer blend in accordance with claim 7.

13. Mould material or polymer blend, in accordance with claim 3, containing approximately 40% by volume of thermoplastically processable starch.

14. Mould material or polymer blend, in accordance with claim 6, in which the softener is acetyl triethyl citrate or phthalic acid ester.

15. Mould material or polymer blend, in accordance with claim 7, in which the phasing agent is selected from the group consisting of partially hydrolyzed polyvinyl acetate, polyvinyl acetate-polyvinyl pyrrolidine block copolymer, polyvinyl acetate copolymerized with maleic anhydride, polyvinyl acetate copolymerized with acrylic acid glycide ester, epoxidized soybean oil, polyvinyl pyrrolidine, starch acetate and starch graft copolymer in which the polymer is bonded to the starch by a covalent bond.

16. Process, in accordance with claim 8, in which the amount of starch is 20–50% by volume.

17. Process, in accordance with claim 16, in which the cellulose derivative is a cellulose ester and the temperature is approximately 160° C.–200° C.

18. Process, in accordance with claim 9, in which the cellulose ester is cellulose acetate, cellulose propionate, cellulose butyrate or a mixture thereof.

19. Biodegradable mould material or polymer blend with a high resistance to moisture, comprising thermoplastically processable starch which is the melted mixture product of essentially moisture-free starch and an additive having a solubility parameter of over 15 $cal^{\frac{1}{2}}cm^{-3/2}$, a vapor pressure of lower than 1 bar in the melting range of the starch/additive mixture and which lowers the melting point of the starch so that the melting point of the starch/additive mixture lies below the decomposition temperature of the starch; and a cellulose derivative.

* * * * *